Nov. 7, 1933.  A. J. HUDSON  1,934,468
RETAINING MEMBER FOR USE WITH PNEUMATIC VALVE STEMS
Filed Jan. 21, 1933

INVENTOR
ARTHUR J. HUDSON.
Kerr Hudson & Kent
Attys.

Patented Nov. 7, 1933

1,934,468

UNITED STATES PATENT OFFICE 1,934,468

RETAINING MEMBER FOR USE WITH PNEUMATIC VALVE STEMS

Arthur J. Hudson, Lakewood, Ohio, assignor to The Dill Manufacturing Company, Cleveland, Ohio, a corporation of Ohio Application January 21, 1933. Serial No. 652,863

4 Claims. (Cl. 152—12)

The present invention relates in general to valve stems which are used in connection with pneumatic tires and similar inflatable devices.

At the present time it is the practice to use a metal valve stem, in connection with the inner tube of a pneumatic tire, this valve stem being provided with a head which is positioned upon the inner side of the inner tube, with the stem proper extending through an opening in the tube, and with suitable clamping means threaded upon the stem, whereby the stem becomes effectively attached to the inner tube.

When an inner tube and the casing or shoe in which it is enclosed are mounted upon the rim of a wheel, the valve stem extends through an opening provided in the rim, and in order to secure the stem, with respect to the rim, it is customary to use a rim nut which is threaded upon the outside of the stem, which nut engages with the rim and thus secures the valve stem in position, with the stem in such position as to easily admit of inflation.

When a tire becomes deflated, due to puncture or any kindred accident, unless the vehicle is stopped immediately, the deflated tube tends to creep within the shoe or casing and it frequently happens that the valve stem is injured, and frequently the inner tube is torn away from the end of the valve stem to which it is attached.

With the present type of rims which are known as drop center rims, the difficulties which have been above mentioned are materially increased.

The purpose of the present invention is to provide a holding means which may be attached to the valve stem and engage with the rim, so that under normal conditions the stem may be retained in its proper position with respect to the rim, but when the tire becomes deflated, as by puncture or otherwise, while the vehicle upon which the tire is mounted is in motion, the stem may readily strip itself with respect to the rim and be drawn into the shoe or casing when the inner tube tends to creep with respect to the shoe.

Reference should be had to the accompanying drawing, forming a part of this specification, in which Fig. 1 is a section with portions in elevation of a drop center rim, with the tire, shoe, inner tube and valve stem associated therewith.

Figure 1:
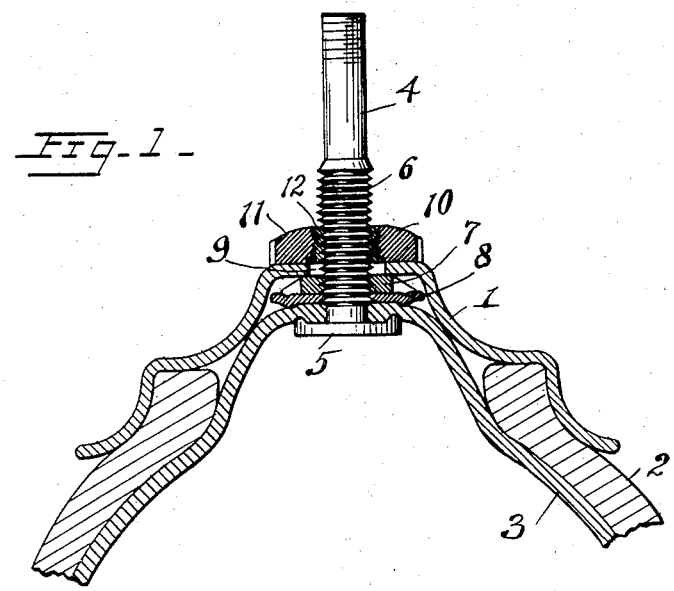

Referring to the drawing, 1 indicates a rim which, in the present instance, is of that variety known as the drop center rim. Associated therewith is a tire casing 2, with an inner tube 3. Associated with the inner tube is a stem 4, which is of usual construction, and intended to receive a valve insides (not shown) of usual construction.

The stem at its inner end is provided with a head 5, and upon its outer surface is provided with threads 6.

Associated with the stem is a clamping nut 7 and spreader 8, which serve to effectively clamp the valve stem with respect to the inner tube.

The rim 1 is provided with an opening 9, through which the valve stem extends. In order to hold the valve stem with respect to the rim, a retaining member 10 is provided, which retaining member comprises a body portion 11 with a central opening, in which there is mounted a sleeve or ferrule 12. This ferrule upon its inner surface is provided with screw threads adapted for engagement with the screw threads 6, upon the outer portion of the valve stem 4. This member 11 may be made polygonal, in order to make possible the application of a wrench for turning purposes.

The purpose in making the retaining member 11 of composite structure is to enable the sleeve or ferrule 12 to be stripped from the member 11 when a deflation of the inner tube occurs at a time when the vehicle wheel upon which the tire is mounted is moving, so that if there is any tendency for the inner tube to creep within the casing, the valve stem may be pulled through the opening in the rim and into the casing, thus preventing any tearing of the inner tube.

On the other hand, the association of the body portion 11 and the sleeve or ferrule 12 is such that the combined body portion 11 and sleeve 12 will ordinarily serve as a rim nut for holding the stem in position upon the rim.

With the foregoing in mind it will be seen that the member 11 may be made of any material which will be suitable for the purpose intended, as for instance rubber or any other material which possesses sufficient rigidity to enable it to function as a rim nut, at the same time yieldingly retaining the sleeve or ferrule 12 to permit of separation of the body portion 11 and the sleeve 12 under the conditions which have been stated above.

Figure 4:
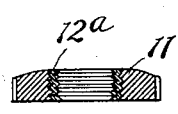
Fig. 4 is a sectional elevation of one form of retaining member.

In Fig. 4 a threaded ferrule 12ª is shown, which may be made of light material and so formed that there are threads upon the outside surface as well as upon the inside surface. The threads upon the outside surface will assist in securing the mechanical unity between the ferrule and the body portion 11.

Figure 5:
Fig. 5 is a sectional elevation of a modified form of stem retaining means.

In Fig. 5 the ferrule 12ª is shown as made of light metal with threads formed therein and provided with a slightly extending flange 12ᵇ. This flange may be at one or both ends of the ferrule and so assist in the mechanical retention of the sleeve or ferrule 12 with respect to the body portion 11.

Figure 2:
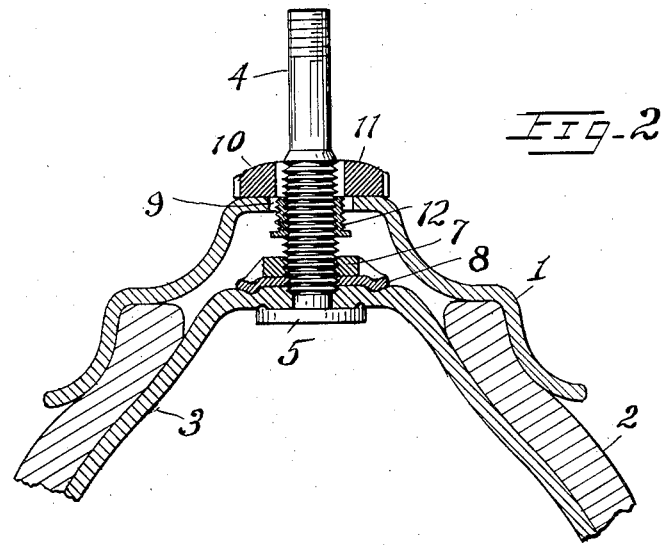
Fig. 2 is a view similar to Fig. 1 showing the action which takes place when the inner tube becomes deflated.
Figure 3:
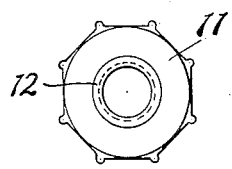
Fig. 3 is a top plan view of the stem retaining member.

In Fig. 2 of the drawing is depicted the action which takes place when the stem 4 is drawn within the rim and casing. The sleeve or ferrule 12 retains its position upon the stem 4, and is pulled out of its association with the body porton 11.

While I have described one embodiment of my invention, it will be appreciated that various modifications and changes may be made without departing from the spirit of the invention.

Having thus described my invention what I claim is:

1. The combination with a rim, a tire casing and inner tube provided with a valve stem, of a retaining member, said retaining member comprising a body portion and an associated part which engages with the valve stem, the said part which cooperates with the valve stem being releasably held by the body portion.

2. The combination with a rim, a tire casing and inner tube provided with a valve stem, of a retaining member adapted to engage with the valve stem and an outside portion of the rim, said retaining member being provided with a threaded sleeve for engagement with the valve stem and the said sleeve being releasably held in the said retaining means.

3. A rim nut for pneumatic valve stems, comprising a body portion and a sleeve portion normally forming a unitary device, the association between the body portion and sleeve being such as to permit a stripping of the sleeve with respect to the body portion.

4. A rim nut for use with pneumatic tire valve stems, comprising a body portion and a metal sleeve, the sleeve and body portion normally forming a unitary device, the association between the metal sleeve and the body portion being such that the sleeve may be stripped from the body portion.

ARTHUR J. HUDSON.